July 20, 1954
S. L. TOLMAN
2,684,157
BAR SCREENING APPARATUS FOR FLOWING
STREAMS OF WATER AND THE LIKE
Filed Feb. 15, 1949
3 Sheets-Sheet 1
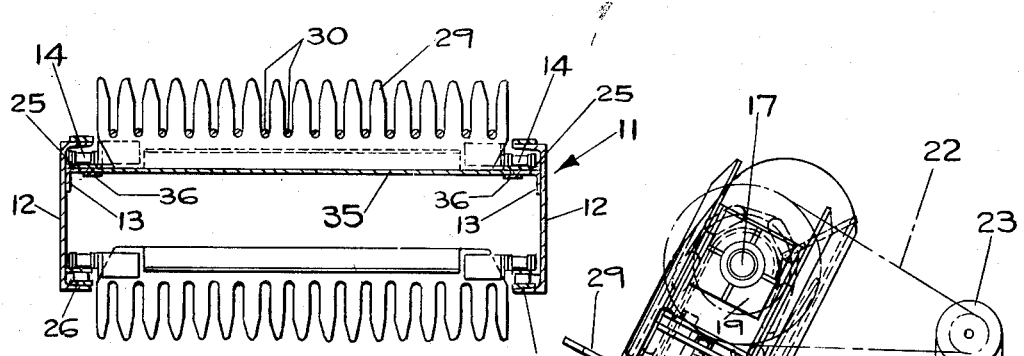
Fig. 2
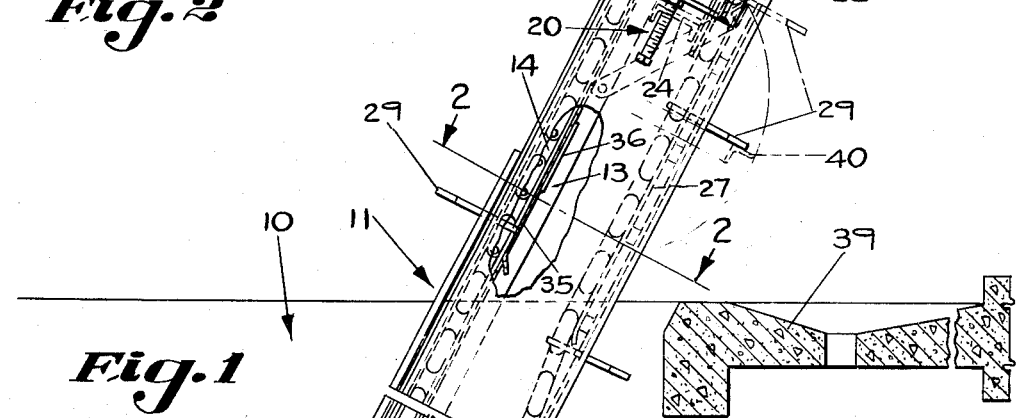
Fig. 1
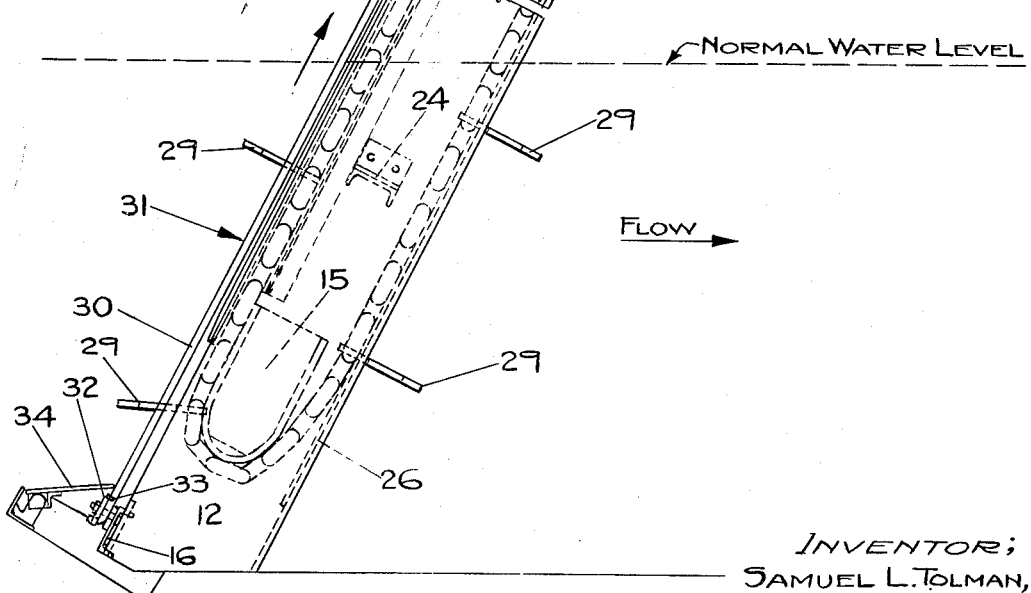
INVENTOR;
SAMUEL L. TOLMAN,
BY
ATTY.

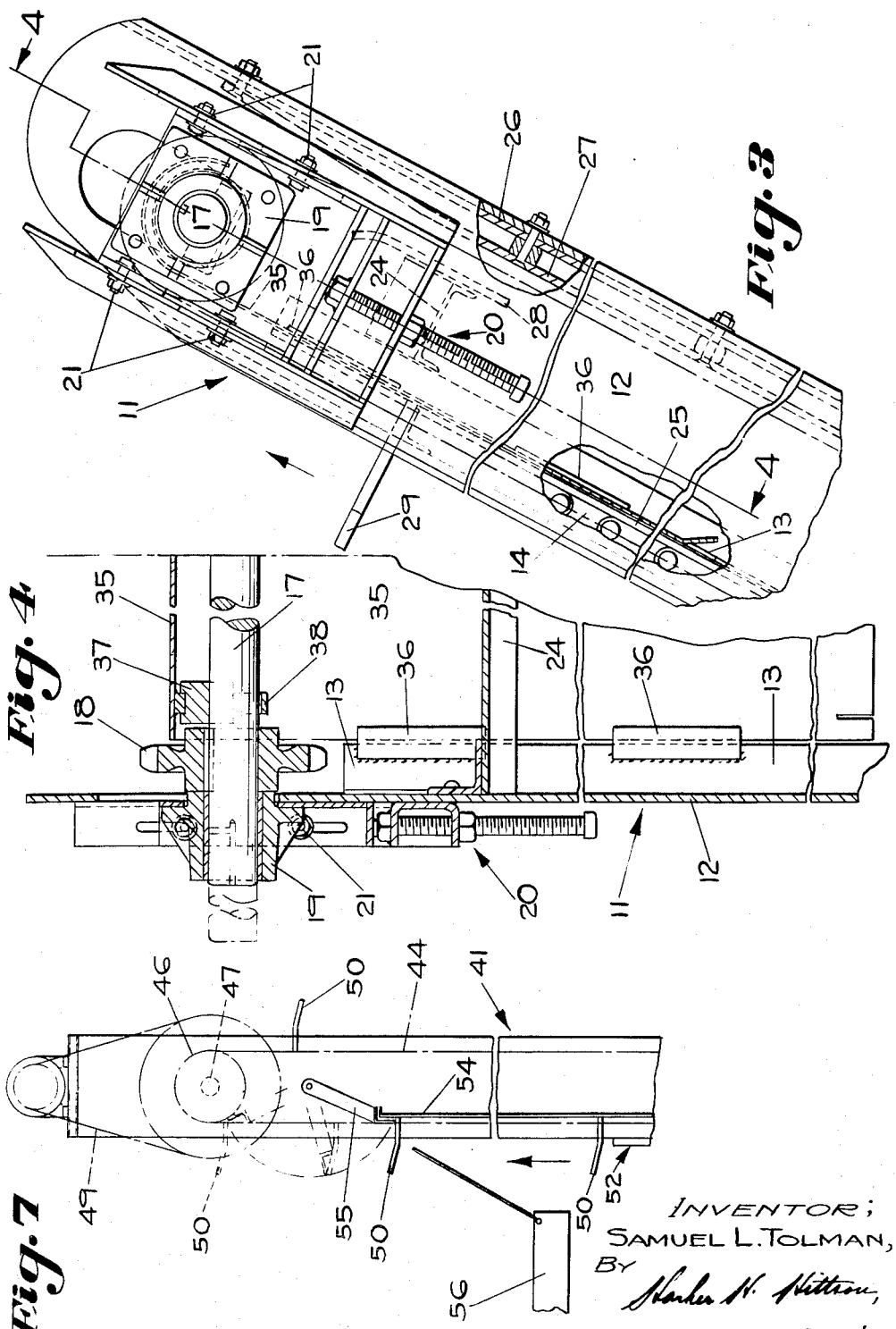

July 20, 1954
S. L. TOLMAN
BAR SCREENING APPARATUS FOR FLOWING
STREAMS OF WATER AND THE LIKE
2,684,157
Filed Feb. 15, 1949
3 Sheets-Sheet 3
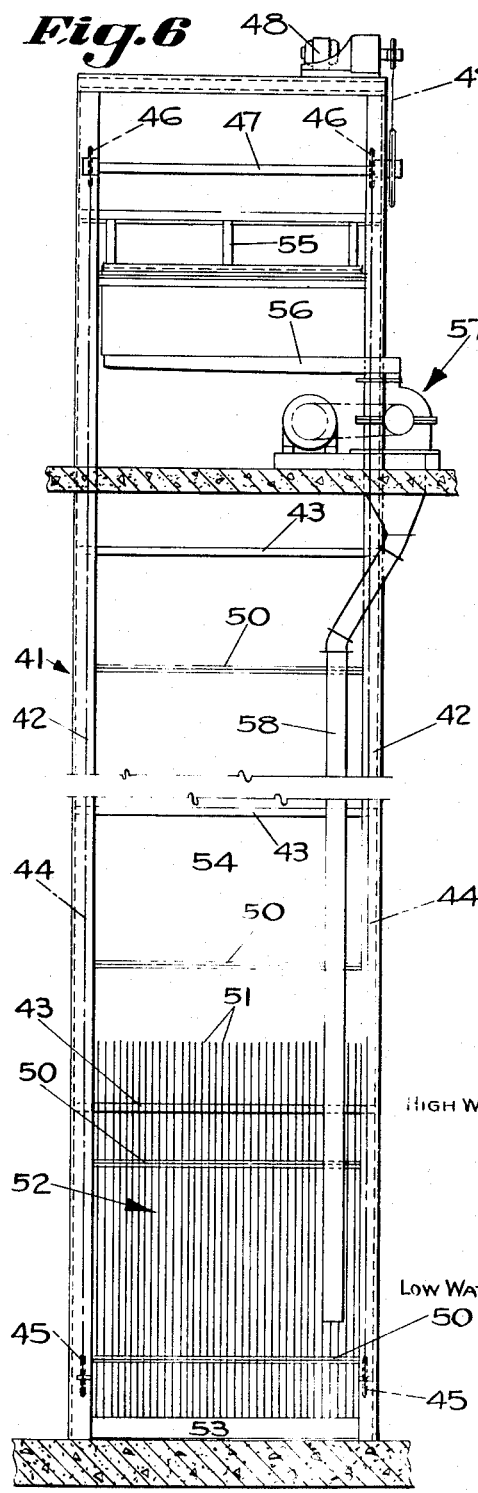
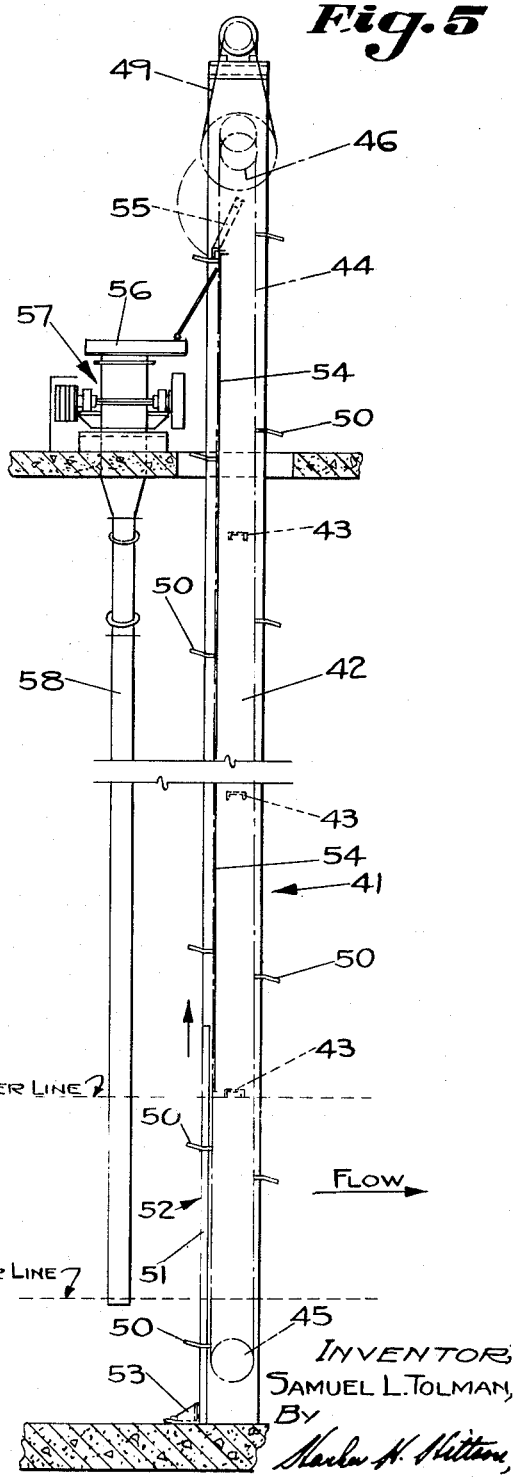
INVENTOR
SAMUEL L. TOLMAN,
BY
ATTY.

Patented July 20, 1954

2,684,157

UNITED STATES PATENT OFFICE 2,684,157

BAR SCREENING APPARATUS FOR FLOWING STREAMS OF WATER AND THE LIKE

Samuel L. Tolman, Columbus, Ohio, assignor to The Jeffrey Manufacturing Company, a corporation of Ohio Application February 15, 1949, Serial No. 76,518

8 Claims. (Cl. 210—176)

This invention relates to a bar screening apparatus adapted to remove trash, branches, and other large particles, from a flowing stream of water, such as a sewage system or a water supply system, or for any other streams.

An object of the invention is to provide improved apparatus of the above mentioned type, particularly in which the draft means for the screen is located downstream of the screen bars, with rake teeth extending between adjacent bars and traveling from the bottom upward, there preferably being a dead plate or scraper plate over which the rakes travel adjacent the upper portion of their path and after the rakes leave the screen bars and have passed out of the liquid.

As a further development of the above object of the invention, the screen preferably also includes an adjustable head shaft by which the tension of the endless draft chains is adjusted, the plate being connected to move upwardly and downwardly with said head shaft.

Other objects of the invention will appear hereinafter, the novel features and combinations being set forth in the appended claims.

In the accompanying drawings,

Fig. 1 is a side elevational view, with parts in section, showing one form of screening apparatus incorporating my invention, it being illustrated as contained in a flume or sluiceway through which a stream of refuse bearing water flows, as suggested by the arrow;

Fig. 2 is a sectional view taken on the line 2—2 of Fig. 1, looking in the direction of the arrows;

Fig. 3 is an enlarged view of the head portion of the screening apparatus of Fig. 1, with parts broken away and shown in section;

Fig. 4 is a sectional view taken on the line 4—4 of Fig. 3 and showing one side of the head portion of the screening apparatus;

Fig. 5 is a side elevational view of a modified form of screening apparatus and associated mechanism;

Fig. 6 is an upstream elevational view of the screening apparatus of Fig. 5; and Fig. 7 is an enlarged view of the head section of the screening apparatus of Figs. 5 and 6.

Referring first particularly to Fig. 1 of the drawings, the screening apparatus as a whole has its bottom portion extending between the vertical side walls of a flume, sluiceway, or channel 10, through which water flows which carries with it material which is to be removed by the screen, such as trash, branches, or any other large material which may be floating down with the stream. The normal water level is illustrated in Fig. 1 of the drawings and, of course, this water level will vary from time to time.

The screening mechanism includes a main frame 11 formed of a pair of opposite channel members 12, 12 which preferably are attached to and fit closely adjacent the upright sides of the flume or channel 10 so that the flowing stream of liquid will all flow through the screening mechanism.

Along the upstream edges of the channel frame members 12 and downstream of the upstream flanges thereof there is a pair of angle members 13 rigidly attached to said channel frame members 12, which angle members 13 cooperate with the upstream flanges of the channel frame members 12 to provide guideways for a pair of laterally spaced endless draft chains 14.

Near the bottom of the main frame 11 there is a U-shaped guide shoe 15 for each of the chains 14 which reverses the direction of travel of each chain, or, in other words, provides a friction shoe for the lower end of each chain 14 as it changes its direction of travel from a downward to an upward direction. The shoes 15 are preferably rigidly and nonadjustably attached to the channel frame members 12. The bases of the frame members 12 are preferably rigidly connected together by a cross channel member 16.

At the upper end of the main frame 11 there is a head shaft 17 provided with spaced sprockets, one of which is seen at 18 in Fig. 4 of the drawings, which sprockets 18 mesh with and drive the two chains 14. Shaft 17 is mounted in adjustable journal bearing boxes 19 which are mounted for adjustment relative to the frame 11 by screw adjusting mechanisms 20 so as to maintain proper tension in the chains 14. Each adjusting mechanism 20 includes clamping devices 21 comprising cooperating slotted angles carried by the boxes 19 and frame channels 12, and clamping nuts and bolts which are, per se, of essentially standard construction.

The shaft 17 is driven by a chain and sprocket drive mechanism 22 from an electric motor 23. The motor 23 drives the draft chains 14 so that their upstream run moves from the bottom of the run upwardly, the downstream run thereby traveling downwardly.

The channel frame members 12 are not only connected in fixed spaced relation by the channel 16, but also by one or more additional cross channels 24, at least one of which is near the head section of the frame 11 and thus holds said channel members 12 in rigid fixed positions relative to each other.

The chain supporting angles 13 are preferably provided with wear strips 25 which actually take the direct bearing contact of the chains 14 as they travel along the upstream guides. During the lower portion of the downstream run, chains 14 travel on wear strips 26 which are carried by the downstream flanges of the channel members 12.

As the chains 14 first start their downward travel they are, however, supported upon wear strips 27 which are slightly spaced from the wear strips 26, as clearly illustrated in Fig. 3 of the drawings. A sprocket stripper 28 is also provided for each chain as it comes off the sprocket 18.

Extending transversely between the two chains 14 and rigidly attached thereto is a plurality of spaced toothed rakes 29, the teeth of which extend between the spaced bars 30, which bars 30 together constitute the screen 31 which effectively screens out the large material from the flowing stream. Each of the bars 30 of the screen 31 is preferably supported in cantilever by being attached at a single point to the main frame 11, which is adjacent its bottom. Each said bar 30 is so attached at its bottom to the cross channel member 16 of the main frame 11 by means of a cross clamping bar 32 which is bolted to the cross channel 16. The clamping bar 32 is preferably notched on its lower edge to receive the bent up ends of each of the screen bars 30, so as to hold each of said screen bars in fixed position. Clamping bar 32 may also have a right angle extension 33 along its top edge, which is likewise notched to receive each of the bars 30.

Adjacent the bottom of the screen 31 there is a hinged toe plate 34 which is hinged at its upstream edge and at its downstream edge rests on the bottom of the screen 31. The tips of the rake blades preferably just clear the hinged toe plate 34 and, in fact, if one of them should touch it, it would merely swing up and then fall down.

It is evident from the above description that the main body of each of the rakes 29 is downstream of the screen 31 and that the rake teeth extend between the bars 30 and upstream therefrom. Furthermore, it is obvious that substantially the entire raking mechanism, including the draft chains 14 and the supporting frame 11, is downstream relative to the screen 31, thus providing no obstructions whatever to the accumulation of the trash, and the like, on the screen 31. It is furthermore evident that under normal conditions there will be at least one and probably more rakes 29 always interleaved with the screen 31.

It is evident that the rakes 29 will thereby provide continuous guiding and supporting means for insuring proper spacing of the bars of the screen 31. This is of particular importance in view of the fact that the upper ends of the bars are entirely free, which is desired because the bars 31 terminate appreciably below the head shaft 17.

Spaced downstream from the bars 30 of the screen 31 and in partial overlapping relation therewith and starting at a position above the water level there is a dead or scraper plate 35 over which the bottom of each rake 29 scrapes as it passes out of the stream and possibly out of the trough or channel 10, while traveling along the upstream surface of scraper plate 35. While traveling through the area of overlap of screen 31 and plate 35, rakes 29 travel between said screen and plate downstream of the former and upstream of the latter. Since the scraper plate 35 has its lower edge slightly below the upper end of each bar 30, the bottom of each rake 29 contacts the scraper plate 35 prior to its leaving the screen bars 30. Obviously, when a rake leaves the upper free end of the screen 31, the trash carried by the rakes will, in part, fall by gravity down on the scraper plate 35, and the rake in continuing its upward travel will scrape this material over said plate 35.

The plate 35 is slidably supported along its edges on the angle members 13 by supporting plates 36 welded to angles 13 (see Figs. 2 and 4). Said plate 35 is curved into a semi-cylinder at its upper end, the semi-cylinder being concentric with and spaced from the shaft 17. Said plate 35 therefore terminates at a position below the axis of the shaft 17 and on the downstream side thereof, as clearly illustrated in Fig. 3 of the drawings.

The scraper plate 35 is connected to the head shaft 17 so as to partake of the up and down adjustment thereof without interfering with its free rotation. To this end the curved upper portion of the plate 35 is provided at each side with a bearing block 37 which is rigidly attached to said curved portion of the plate 35 and has bearing contact with the shaft 17. An encircling strap 38 attaches each block 37 to the shaft 17 without interfering with the free rotation of the shaft 17 relative thereto.

It is thus evident that the relative position of the scraper plate 35 and the shaft 17 is fixed, while the scraper plate 35 is slidable along the main frame 11 so that the relative position of its lower edge and the upper end of the screen 31 may vary from time to time. However, the overlapping relation of the two along a plane at right angles to the direction of travel of the chain 14 is maintained at all times so that in no case will trash, or the like, be removed from the screen 31 by a rake 29, except when the bottom of the rake is sliding over the plate 35.

When a rake 29 travels over the head shaft 17 and thus starts its downward run there will be a tendency for the gathering trash to fall off of it under the influence of gravity. Such trash may be received, for example, by a sump 39 forming a part of the channel 10 and provided with a central drain which can allow water to drain from the trash and run back into the stream. A pivoted rake scraping or wiping mechanism 40 is also preferably provided to cooperate with the rakes 29 to insure a thorough cleaning of them. This cleaning takes place while the rakes 29 are traveling along the wear strips 27 provided at the head section of the screening mechanism.

The screening mechanism of Figs. 1 to 4, inclusive, has the plane of the screen 31 inclined to the vertical. In Figs. 5, 6 and 7 of the drawings there is illustrated a modified form of screening apparatus which is quite high and which is shown mounted in a vertical position. This is desirable particularly in view of the great height of the channel or sluiceway in which it operates.

The screening mechanism of said Figs. 5, 6 and 7 includes a main frame 41 formed of a pair of spaced-apart frame members 42 which extend between the side walls of a flume, sluiceway or channel and which are held in fixed position by a plurality of cross members 43. Endless draft chains 44 are carried on opposite sides of the main frame 41 in a manner evident from the above description of the screen of Figs. 1 to 4. The draft chains 44 travel around foot sprockets 45 and head sprockets 46 carried on a shaft 47. Head shaft 47 is vertically adjustable to adjust the tension on the chains 44 and is driven from a motor 48 through appropriate drive mechanism 49.

The draft chains 44 carry cross toothed rakes 50, the teeth of which extend between adjacent cantilever bars 51 of a flat or plane screen 52. The bottoms of the bars 51 are clamped to the main frame 41 by a cross clamping bar 53 which may correspond with the above described bar 32. A dead or scraper plate 54 is provided, the bottom edge of which overlaps the upper edge of the screen 52, and the upper end of which terminates below the head shaft 47.

The scraper plate 54 is rigidly attached to the main frame 41 and does not partake of the up and down movement of the head shaft 47. Scraper or wiper mechanism 55 is provided to scrape or wipe trash from the rakes 50 prior to their passing over the upper end of the scraper plate 54, said wiper mechanism 55 being carried by said main frame 41.

The trash scraped from the rakes 50 is delivered to a pan 56 by which it may be scraped to a shredder of grinder 57 and reduced to a sufficiently fine state so that it will pass through the screen 52. The output of the shredder or grinder 57 is preferably delivered to the screen by a chute 58 at a position upstream of the screen 52.

In this screening mechanism it is not necessary to move the scraper plate 54 with the head shaft 47 because the trash is removed from the rakes 50 prior to their passing over said head shaft 47. It is to be noted, however, that the important overlapping relation between the scraper plate 54 and the screen 52 exists and that these parts are spaced apart so that the rakes 50 and the draft chains can pass downstream of the screen 52 and upstream of the scraper plate 54, they successively providing support for the screened material in cooperation with the rakes until said screened material is ready to be wiped therefrom by the scraper or wiping mechanism 55.

It is thus to be seen that in both embodiments of the invention in its broad aspects, substantially the entire screening mechanism, including particularly the main frame and the draft means for the rakes, is located downstream of the screen so that there will be substantially no interference with the accumulation of material thereon.

Furthermore, the individual screen bars of the screens are rigidly supported only at their bottoms, they being guided and maintained in a predetermined lateral position relative to each other by the teeth of the cooperating rakes. Furthermore, as the rakes pass upwardly beyond the extremity of the screen, they are under the influence of the overlapping scraper plate 54 which cooperates with the rakes to carry the accumulated refuse until it is ready to be discharged.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. In a bar screen apparatus for screening material from a stream of water including a frame adapted to extend upwardly through a water stream and above the high water line thereof, spaced toothed rakes, endless draft means connected to said rakes and operative over said frame, means driving said draft means to cause said rakes to travel upwardly on the upstream side of said frame, a screen on the lower portion of the upstream side of said frame through which the teeth of said rakes extend, said screen including individual laterally spaced upstanding bars, each attached to said frame at the bottom thereof, and a plate carried by said frame along the upper portion thereof positioned downstream of and overlapping the upper end of said screen so the rakes ride thereover before leaving the upper end of said screen and thereafter in their upward travel.

2. A bar screen apparatus for screening material from a stream of water including a frame adapted to extend upwardly through a water stream and above the high water line thereof, spaced toothed rakes, endless draft means connected to said rakes and operative over said frame, means driving said draft means to cause said rakes to travel upwardly on the upstream side of said frame, a screen on the lower portion of the upstream side of said frame through which the teeth of said rakes extend, said screen including individual laterally spaced upstanding bars, each attached to said frame at the bottom thereof while being otherwise entirely free of said frame, a plate carried by said frame along the upper portion thereof positioned downstream of and overlapping the upper end of said screen so the rakes ride thereover before leaving said screen and thereafter in their upward travel, and means for discharging material from said apparatus.

3. A bar screen apparatus for removing material from a flowing stream, said screen apparatus including upwardly extending bars in a plane supported at their bottoms, a plate parallel with the plane of said bars and spaced downstream therefrom and overlapping them while extending upwardly beyond said bars, endless draft means downstream of said bars, toothed rakes carried by said draft means operable when traveling upwardly to have their teeth extend through the spaces between the bars of said screen during the first part of their upward travel and then to slide over said parallel plate during a later portion of their travel, means for discharging material from said apparatus, drive means for said draft means including a head shaft, means mounting said head shaft for up and down adjustment to adjust the tension of said draft means, and means interconnecting said head shaft and said parallel plate whereby when the shaft is adjusted as aforesaid the plate moves with it, said drive means being operable to move said rakes from the bottom upwarly on their upstream travel.

4. A bar screen apparatus for removing material from a flowing stream, said screen apparatus including laterally spaced upstanding cantilever mounted bars, a plate overlapping a portion of said bars and spaced downstream therefrom while extending beyond the ends of said bars, toothed rake means, means operable to move said rake means across said bars downstream thereof with the teeth thereof extending upstream between said bars and then over said plate upstream thereof after leaving said bars, said teeth acting to hold said screen bars in predetermined spaced relation, and means for discharging material from said apparatus.

5. A bar screen apparatus for removing material from a flowing stream, said screen apparatus including laterally spaced upstanding bars, a plate overlapping a portion of said bars and spaced downstream therefrom while extending beyond the ends of said bars, rake means having teeth adapted to extend upstream between said laterally spaced bars, means operable to move said rake means across said screen downstream thereof with said rake teeth projecting between said bars as aforesaid and then over said plate upstream thereof after leaving said screen, and means for discharging material from said apparatus.

6. A bar screen apparatus for removing material from a flowing stream, said screen apparatus including upwardly extending bars in a plane supported at their bottoms, a plate parallel with the plane of said bars and spaced downstream therefrom and overlapping them while extending upwardly beyond said bars, said plate including a curved portion, endless draft means downstream of said bars, toothed rakes carried by said draft means operable when traveling upwardly to have their teeth extend through the spaces between the bars of said screen during the first part of their upward travel and then to slide over said parallel plate during a later portion of their travel, drive means for said draft means including a head shaft, means mounting said head shaft for up and down adjustment to adjust the tension of said draft means, and means interconnecting said head shaft and the curved portion of said parallel plate whereby when the shaft is adjusted as aforesaid the plate moves with it, said drive means being operable to move said rakes from the bottom upwardly on their upstream travel and over said curved portion of said plate to discharge material over the latter.

7. A bar screen apparatus for removing material from a flowing stream, said screen apparatus including laterally spaced upstanding bars, a plate spaced downstream therefrom and overlapping said bars, said plate including a curved portion, endless draft means downstream of said bars, toothed rakes carried by said draft means operable when travelling upwardly to have their teeth extend upstream in the spaces between said bars during the first part of their upward travel and then to travel over said plate during a later portion of their travel, and drive means for said draft means including a shaft, said curved portion of said plate extending over said shaft and said drive means being operable to move said rakes upwardly across said bars and plate and over said curved portion of said plate to discharge material over the latter.

8. A bar screen apparatus for removing material from a flowing stream, said screen apparatus including laterally spaced upstanding bars, means spaced downstream thereof forming a curved surface and overlapping said bars, endless draft means downstream of said bars, toothed rakes carried by said draft means operable when traveling upwardly to have their teeth extend upstream in the spaces between said bars during the first part of their upward travel and then to travel over said plate during a later portion of their travel, and drive means for said draft means operable to move said rakes upwardly across said bars and over said surface forming means to discharge material over the latter.

References Cited in the file of this patent

UNITED STATES PATENTS

| Number | Name | Date |
|---|---|---|
| 1,180,798 | Spoon | Apr. 25, 1916 |
| 1,748,151 | Stehling | Feb. 25, 1930 |
| 2,128,348 | Briggs | Aug. 30, 1938 |
| 2,379,615 | Walker | July 3, 1945 |